(12) United States Patent
Zavattieri et al.

(10) Patent No.: US 9,255,619 B2
(45) Date of Patent: Feb. 9, 2016

(54) BI-STABLE AND MULTI-STABLE DEVICES

(75) Inventors: Pablo D. Zavattieri, Ann Arbor, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 777 days.

(21) Appl. No.: 13/250,365

(22) Filed: Sep. 30, 2011

(65) Prior Publication Data
US 2013/0082427 A1    Apr. 4, 2013

(51) Int. Cl.
*F16F 3/02*    (2006.01)

(52) U.S. Cl.
CPC ........... *F16F 3/02* (2013.01); *F16F 2224/0258* (2013.01)

(58) Field of Classification Search
CPC ............................. F16F 3/02; F16F 2224/0258
USPC .................. 267/156, 158, 159, 160, 162, 164; 345/690, 55, 87, 156–184; 257/414–420, 467–470; 434/113–115
See application file for complete search history.

(56) References Cited

U.S. PATENT DOCUMENTS

| 4,601,413 A | 7/1986 | Krawagna |
| 4,655,629 A * | 4/1987 | Flaherty ......................... 403/291 |
| 6,141,831 A | 11/2000 | Novin et al. |
| 6,371,463 B1 * | 4/2002 | Sorovshian .................... 267/158 |
| 6,664,702 B2 * | 12/2003 | Soroushian .................... 310/246 |
| 7,258,207 B2 * | 8/2007 | Ohnishi et al. ............. 188/79.52 |
| 2005/0072579 A1 * | 4/2005 | Gambier ........................ 166/387 |
| 2005/0116798 A1 * | 6/2005 | Bintoro et al. ................... 335/78 |
| 2005/0172462 A1 * | 8/2005 | Rudduck et al. ................ 24/606 |
| 2009/0320992 A1 * | 12/2009 | Xu et al. ........................ 156/155 |
| 2011/0179790 A1 * | 7/2011 | Pretorius .................... 60/641.15 |

\* cited by examiner

*Primary Examiner* — Robert A Siconolfi
*Assistant Examiner* — Mahbubur Rashid
(74) *Attorney, Agent, or Firm* — Cantor Colburn LLP

(57) ABSTRACT

A bi-stable or multi-stable device having two or more stable positions includes an elastically deformable member having two or more stable positions of minimal potential energy, the deformable member being movable, in response to an external force applied to the deformable member, between stable positions by moving through a position at which the deformable member has a peak potential energy. The device also includes an energy storage member, either separate from or part of the deformable member, that absorbs energy from the external force applied to the deformable member as the deformable member moves from a stable position toward a position of peak potential energy, and releases energy as the deformable member moves from a position of peak potential energy toward a stable position, wherein the energy storage member includes a super elastic shape memory alloy (SMA).

22 Claims, 5 Drawing Sheets

BI-STABLE AND MULTI-STABLE DEVICES

FIELD OF THE INVENTION

Exemplary embodiments of the present invention are related to deformable bi-stable devices having two or more stable positions and, more specifically, to bi-stable devices having unique energy storage and release characteristics.

BACKGROUND

Deformable mechanical bi-stable devices ("bi-stable" is defined herein as referring to such devices having two or more stable positions, and therefore includes multi-stable devices) have been widely used for a variety of applications. For example, user input devices such as push-buttons are commonly used in many devices and may utilize a bi-stable device where each position of the button corresponds to a stable position of the bi-stable device. Computers, telephones, and vehicle control panels are just a few of the numerous applications requiring some sort of user input that can utilize a bi-stable device. Another application for a bi-stable device is for a hinge where a bi-stable device is incorporated into a hinge mechanism to provide stop points or resting positions for the hinged components, each such stop point or resting position corresponding to a stable position of the bi-stable device.

An exemplary bi-stable device, which can be used for illustration of characteristics shared by a wide variety of bi-stable devices, is known as the oil can device, and is illustrated in FIGS. 1A and 1B. FIGS. 1A and 1B depict a schematic diagram of an exemplary bi-stable device 10 having a circular deformable panel 14. In FIGS. 1A and 1B, a cylindrical mounting member 12 having an upper lip portion 13 is mounted on a support structure 11. An elastically deformable circular panel 14 is attached to the inner circumference of the mounting member. The elastically deformable panel would have a normally flat state, but is sized to have a diameter in its normal flat state that is greater than the internal diameter of the mounting member so that when it is mounted in the mounting member it is placed under a force load along vectors between opposing points on the circumference of the panel (in the horizontal plane as shown in FIG. 1). This load causes the elastically deformable panel to deform into one of two stable states, described for sake of convenience as an upper or first stable position depicted in FIG. 1A and a lower or second stable position depicted in FIG. 1B. The panel thus acts as a bi-stable snap-action panel, deformable between a convex stable configuration and a concave stable configuration. This configuration is also sometimes referred to as the "oil-can" configuration because the bi-stable snap action deformation was used in traditional old-style oil cans to displace oil out of an opening in the can.

One way that the performance characteristics of a bi-stable device is commonly represented is by a plot of potential energy versus position (i.e., physical displacement) of the device. FIG. 2 depicts a potential energy plot for an exemplary bi-stable device such as the device of FIG. 1, with potential energy E represented on the y-axis and position (P) represented on the x-axis. As seen in FIG. 2, the two stable positions of the device from FIG. 1 (corresponding to the respective positions illustrated in FIGS. 1A and 1B) are shown at positions $P_1$ and $P_2$ where the potential energy as at its minimum $E_{min}$. The position $P_1$ represents the potential energy at the unstable position of maximum potential energy $E_{max}$ when the deformable panel 14 passes through the position mid-way between the positions of FIGS. 1A and 1B where it is neither convex nor concave. It should be noted that the exemplary device of FIGS. 1A and 1B has symmetrically stable positions that have the same potential energy, Emin. Other device designs may have unsymmetrical stable positions (or multiple stable positions) that have different free energies.

Two important performance characteristics of the bi-stable device performance represented in FIG. 2 are transition energy and stability. Transition energy is the amount of energy required to transition the bi-stable device from one stable position ($P_1$) to the other stable position ($P_2$), and is represented by the difference between $E_{min}$ and $E_{max}$. "Stability" refers to the stability of the bi-stable device in its stable positions, and is represented by the steepness of the slope of curve of the potential energy plot on either side of the stable positions $P_1$ and $P_2$. A relatively steep slope on either side of the stable positions represents a relatively high level of stability, whereas a relatively shallow slope on either side of the stable positions represents a relatively low level of stability.

It is often desirable in certain situations to provide a bi-stable device with a relatively low transition energy so that the device is easier to move between stable positions. This can be accomplished by reducing the stiffness of the deformable member, either by using a material with a lower Young's modulus, by reducing the thickness of the deformable member, or by increasing the length (between mounting members) or diameter of the deformable member, or by any combination of these factors. Another way the transition energy can be modulated is by utilizing an elastic member such as a spring in conjunction with the deformable member, such as shown in FIG. 3. The pre-load in the spring 22 can be adjusted to modify the transition energy required to switch the deformable member 14 from one stable position to another. In FIG. 3, the deformable panel 14 is square or rectangular in shape, and is mounted and disposed between fixed right mounting member 12 and sliding left mounting member 20. Slidable right mounting member 20 is slidably mounted on support structure 11. Fixed right mounting member 12 and left member 12' are each fixedly mounted on the support structure 12. Spring 22 is disposed between and connected to mounting member 12 and slidable mounting member 20. Spring 22 is configured so that it is in an expanded state, and thus urges slidable member 20 towards mounting member 12, thereby exerting a horizontal compressive load on the deformable panel 14 to cause it to deform into one of two stable positions. During deformation of the deformable panel 14, slidable member 20 moves to the left as spring 22 absorbs energy, thereby reducing the amount of force required to displace the deformable panel.

The energy plot of an exemplary device like the one shown in FIG. 3 (or the FIG. 1 device where a lower modulus used) is shown in FIG. 4. As can be seen from a comparison of FIG. 4 with FIG. 2, the transition energy is significantly lower in FIG. 4 (note that although FIGS. 2 and 4 are not drawn to a particular scale, they are proportionately dimensioned for purposes of visual comparison). However, reducing the transition energy for a bi-stable device in this fashion where the stable positions $P_1$ and $P_2$ are kept the same also results in a reduction in stiffness of the system around its stable positions. The reduction in stiffness is readily observed by comparing the curves shown in FIGS. 2 and 4. The stiffness of the system at (any point, but specifically at) a stable position varies as the curvature (or varies inversely as the radius of curvature) of the energy vs. displacement graph. Higher curvature (or lower radius of curvature) indicates higher system stiffness at the stable position. Note that curvature is a local property i.e. it is strictly defined only at a point. Theoretically, the slope of the sides of the 'W' shaped energy vs. displacement graph is not relevant to the stiffness of the system precisely at the stable position. Of course, practical systems have smooth energy vs. displacement graphs, which necessitates that graphs with a high curvature at a stable position will also have steep slopes near this position. The steepness of the slope of the plot on either side of the stable positions $P_1$ and $P_2$, where it is seen that the steepness of the slope is much lower for FIG. 4 than for FIG. 2, indicating lower stiffness. Lower stiffness is often undesirable as the device may be displaced away from its stable position by a considerable distance by unintended vibration or incidental contact; however, conventional techniques have been unable to reduce transition energy without also reducing stiffness.

Accordingly, there is a need for bi-stable devices that can provide low levels of transition energy with high levels of stiffness in their stable positions.

SUMMARY OF THE INVENTION

In one exemplary embodiment, a bi-stable or multi-stable device having two or more stable positions includes an elastically deformable member having two or more stable positions of minimal potential energy, the deformable member being movable, in response to an external force applied to the deformable member, between stable positions by moving through a position at which the deformable member has a peak potential energy. The device also includes an energy storage member, either separate from or part of the deformable member, that absorbs energy from the external force applied to the deformable member as the deformable member moves from a stable position toward a position of peak potential energy, and releases energy as the deformable member moves from a position of peak potential energy toward a stable position, wherein the energy storage member includes a super elastic shape memory alloy (SMA).

In another exemplary embodiment, a method of using the above-described device includes applying force to one or more components of the device to move the elastically deformable member between stable positions by moving through the position at which the deformable member has a peak potential energy. In yet another exemplary embodiment, the method also includes controlling the temperature of the super elastic shape memory alloy in order to control the device's transition force.

The above features and advantages, and other features and advantages of the invention are readily apparent from the following detailed description of the invention when taken in connection with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DESCRIPTION OF THE EMBODIMENTS

Figure 1A:
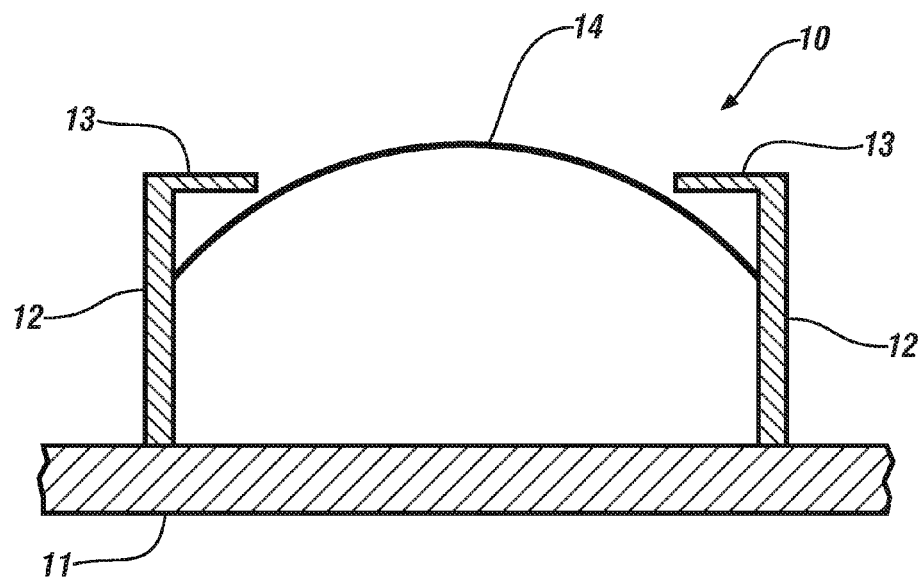
FIGS. 1A and 1B depict a schematic diagram of an exemplary bi-stable device having a deformable member.

The following description is merely exemplary in nature and is not intended to limit the present disclosure, its application or uses. It should be understood that throughout the drawings, corresponding reference numerals indicate like or corresponding parts and features.

Figure 5:
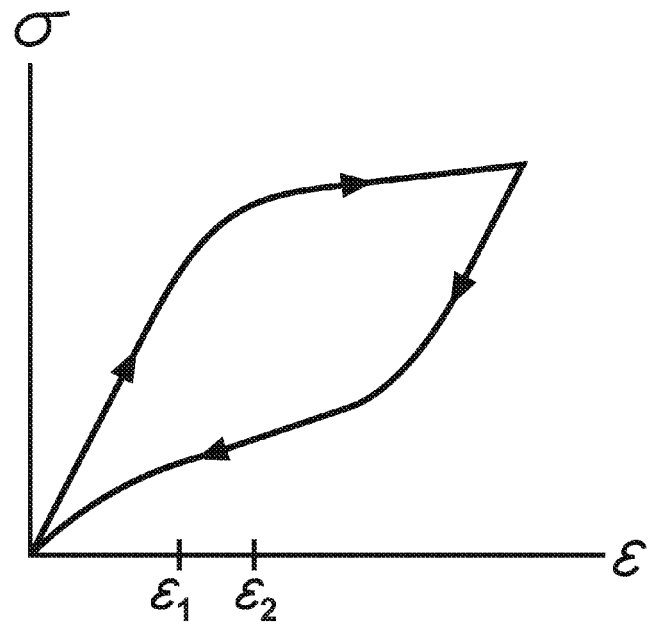
FIG. 5 depicts an exemplary stress versus strain plot of a super elastic SMA.

A super elastic SMA exhibits unique stress/strain properties due to a strain-induced phase transformation between a high-modulus austenitic phase and a lower-modulus martensitic phase. FIG. 5 depicts an exemplary stress versus strain plot of a typical super elastic SMA. Strain ($\epsilon$), as percent (%) and shown on the x-axis, is the amount of deformation to which the material is subjected. Stress ($\sigma$), as force divided by cross-sectional area (e.g., $N/m^2$), is shown on the y-axis. The behavior of the super elastic SMA when subjected to strain is depicted by the plot in FIG. 5. Starting from the lower left position on the plot at 0% strain with the material in its austenitic phase, it is seen that stress rises in a more or less linear fashion as strain increase. During this stage, the super elastic SMA may undergo elastic deformation in a manner similar to any conventional elastically-deformable material. As strain increases, the slope of the plot begins to flatten out at a strain level around the position of $\epsilon_1$, becoming a relatively straight line around the position of $\epsilon_2$. This is the result of a stress-induced, solid-state, diffusion based phase transformation from Austenite to tensile (or 'de-twinned') martensite. The low modulus associated with the phase transformation process persists until the transformation is completed. The total strain accumulated until the end of transformation can range from 4-10% depending on the material composition and texture. Most of this strain is recoverable elastically by just unloading the material. A conventional (i.e. non-superelastic) elastic metal-based material is capable of much smaller elastically recoverable strains (typically, <1%). Due to the relatively low modulus during the phase transformation, large levels of deformation can be imposed in this phase with relatively low amounts of applied force. When the force is released, the stress/strain plot follows a different path, but ultimately the material returns to its original starting position of an austenitic phase material at 0% strain.

Figure 2:
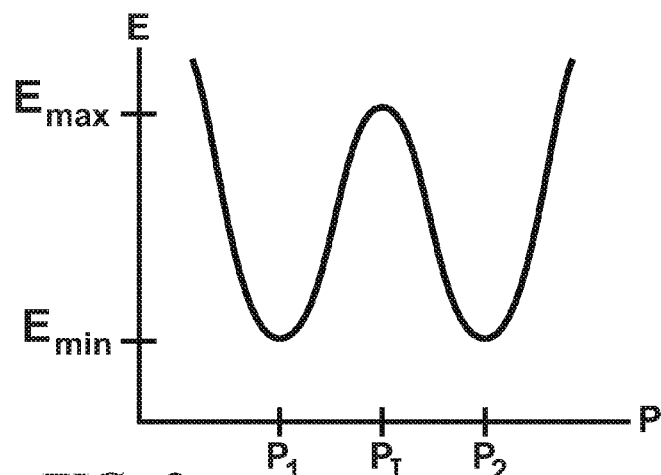
FIG. 2 depicts an exemplary energy versus displacement plot of a deformable bi-stable device such as FIG. 1.

The bi-stable devices (including multi-stable devices) described herein utilize an energy storage member that comprises a super elastic SMA. In an exemplary embodiment, the energy storage member is configured so that super elastic SMA undergoes a phase change from the high-modulus austenitic phase to a stress-induced martensitic phase during movement of the device between a stable position towards a position of peak potential energy, and exhibits a reduced modulus that accompanies this transition. As the super elastic SMA energy storage member deforms while storing energy during movement of the device, it should be configured to partially or fully undergo a phase transformation from austenitic to martensitic before it would get to the device's position of peak potential energy. The drop in modulus that accompanies this phase change will substantially reduce the amount of force required to impose further deformation onto the device, which will reduce the height of the peak potential energy position $P_1$ from FIG. 2 (thereby lowering the transition energy of the device) without affecting the shape of the curve at low levels of deformation (i.e., strain) so that the stiffness of the bi-stable device in its stable position(s) is not adversely affected.

Figure 3:
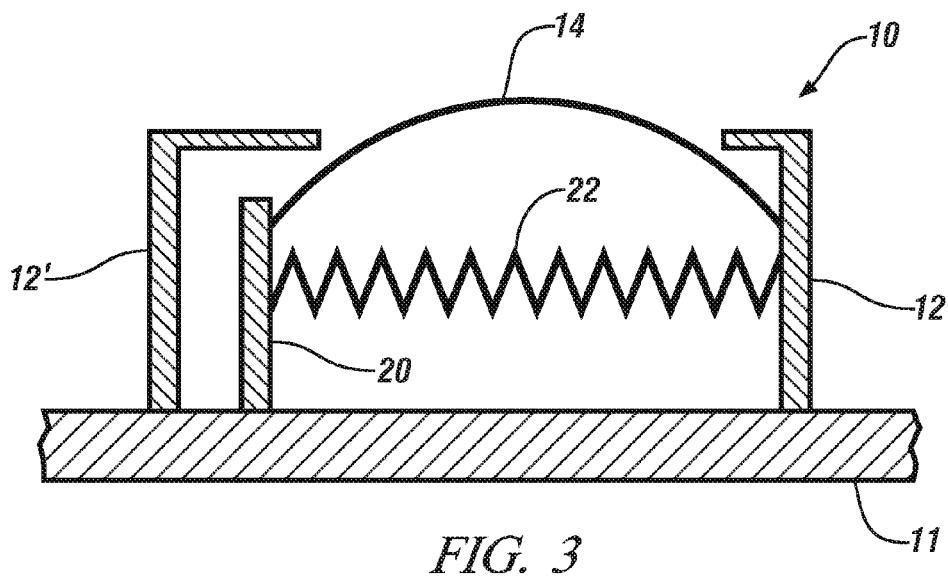
FIG. 3 depicts a schematic diagram of an exemplary bi-stable device with a spring used to reduce transition energy.
Figure 4:
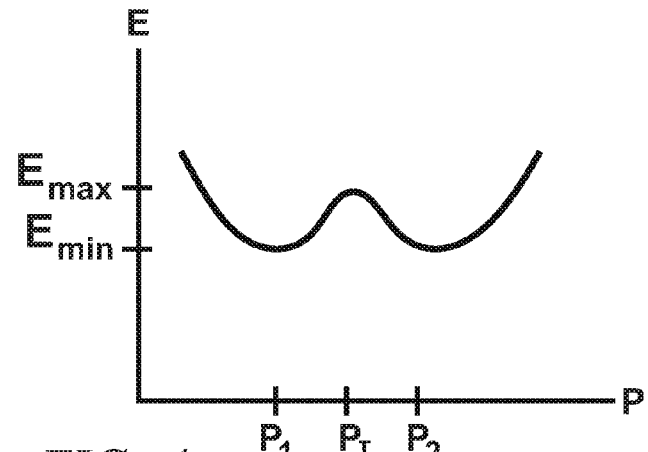
FIG. 4 depicts an exemplary energy versus displacement plot of a deformable bi-stable device such as FIG. 3.
Figure 6:
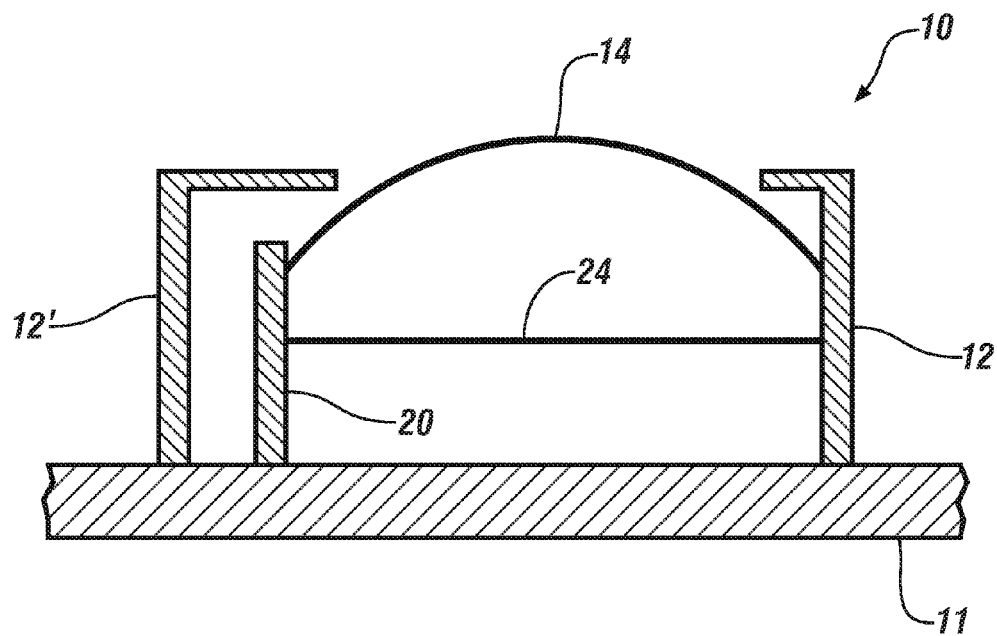
FIG. 6 depicts a schematic diagram of an exemplary bi-stable device that includes a super elastic SMA energy storage member.
Figure 7:
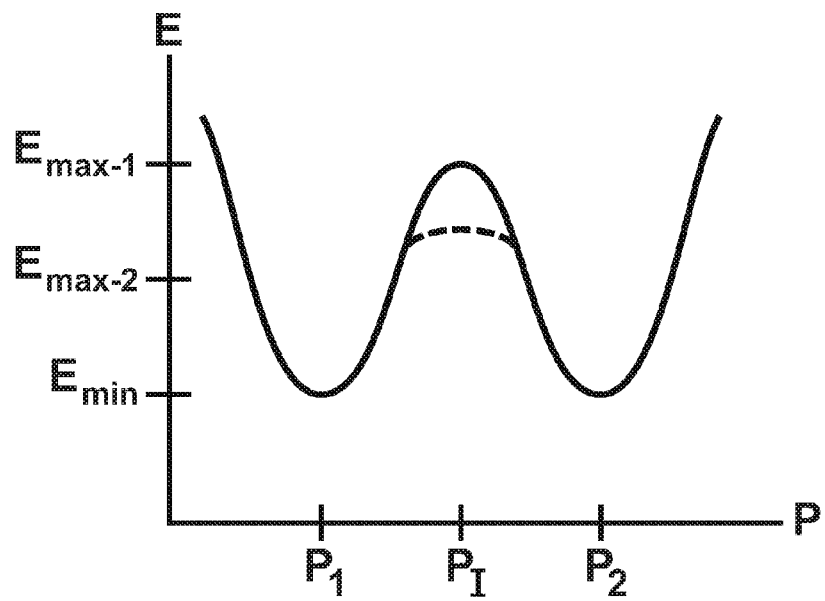
FIG. 7 depicts an exemplary energy versus displacement plot of a deformable bi-stable device such as FIG. 6.

This effect is graphically illustrated in FIGS. 6 and 7. FIG. 6 depicts a deformable bi-stable device, identical in configuration to the device of FIG. 3, but with the spring 22 replaced with a super elastic SMA wire (or alternatively a super elastic SMA tension spring) 24. FIG. 7 depicts a plot of potential energy versus position, with the solid line representing the performance of a device as shown in FIG. 3, but with a stiffer spring 22 and/or deformable panel 14 to produce a performance plot that is intermediate to the plots shown in FIGS. 2 and 4. When the spring 22 from FIG. 3 is replaced with a super elastic SMA wire 24 that has similar stress vs. strain performance in its austenitic phase as stress vs. strain performance of the spring 22, but that undergoes a strain-induced phase transformation to its martensitic phase before reaching the unstable $P_1$ position, the resulting drop in modulus reduces the amount of force or energy that must be applied to further move the device through the unstable $P_1$ position. This has the effect of essentially cutting off the top of the peak energy position of the plot, and the performance of the FIG. 6 device in the region of the $P_1$ unstable position is represented by the dotted line in FIG. 7. As shown in FIG. 7, the super elastic SMA energy storage member reduces the transition energy from $E_{max-1}-E_{min}$ to $E_{max-2}-E_{min}$ without adversely impacting the stiffness of the device in the regions around stable positions $P_1$ and $P_2$.

The energy storage member that comprises super elastic SMA may be separate from or a part of the deformable member of the bi-stable device. In one exemplary embodiment where the energy storage member is part of the deformable member of the bi-stable device, the entirety of the deformable member is made of super elastic SMA so that the energy storage member and the deformable member are effectively one and the same. In another exemplary embodiment where the energy storage member is only a part of the deformable member of the bi-stable device, a portion less than the entirety of the deformable member is made of super elastic SMA. In one exemplary embodiment, this can be accomplished by fabricating deformable member as a composite element (e.g., using conventional metal forming and alloying techniques) so that a portion of the deformable member is made of super elastic SMA and a portion is made of a conventional deformable metal alloy (or other conventional material such as an elastomeric polymer). In another exemplary embodiment, the entire deformable member can be fabricated from an alloy capable of super elasticity and shape memory behavior, but only a portion of the deformable member is treated with temperature and controlled deformation (known as "training" the SMA) to induce super elasticity in that portion while the remainder of the deformable member is not trained to induce super elasticity.

Figure 8:
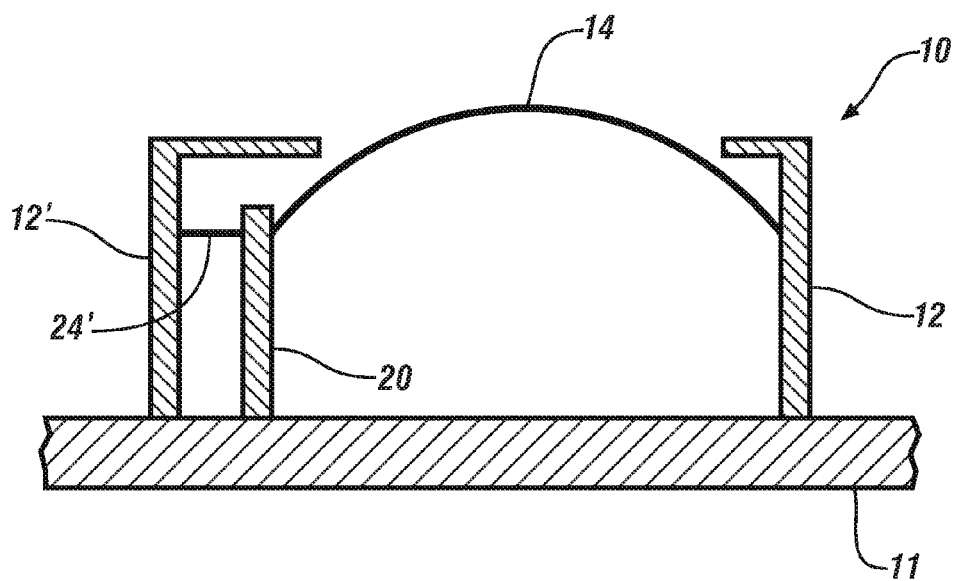
FIG. 8 depicts a schematic diagram of an exemplary bi-stable device that includes a super elastic SMA energy storage member.

In another exemplary embodiment, the energy storage member comprising super elastic SMA may be separate from the deformable member. One such embodiment is depicted in FIG. 6, described above. Of course, the embodiment shown in FIG. 6 is exemplary, and many other configurations can be implemented. Another exemplary embodiment is shown in FIG. 8, which has the same numbered elements as FIG. 6, but instead of having the energy storage member wire 24 mounted between right mounting member 12 and left slidable mounting member 20, has a super elastic SMA energy storage member compression spring 24' mounted between the left slidable mounting member 20 and left member 12', which is fixedly mounted on support structure 11 along with right mounting member 12 so that left member 12' is in a fixed relationship with right mounting member 12. In this exemplary embodiment, super elastic SMA compression spring 24' stores energy as it resists the compressive load placed on it as the deformable member 14 is moved out its stable position(s). Of course, where the super elastic SMA energy storage member is separate from the deformable member (e.g., FIG. 6) or is a distinct portion of the deformable member, then the elastically deformable member or the non-SMA portions of the elastically deformable member will also store some energy as the member is deformed. Unlike the effect of the super elastic SMA energy storage member, energy storage by conventional elastically deformable member does not provide for modulation of the device's transition energy independently from the characteristics of the device at low levels of deformation (i.e., strain).

Figure 1B:
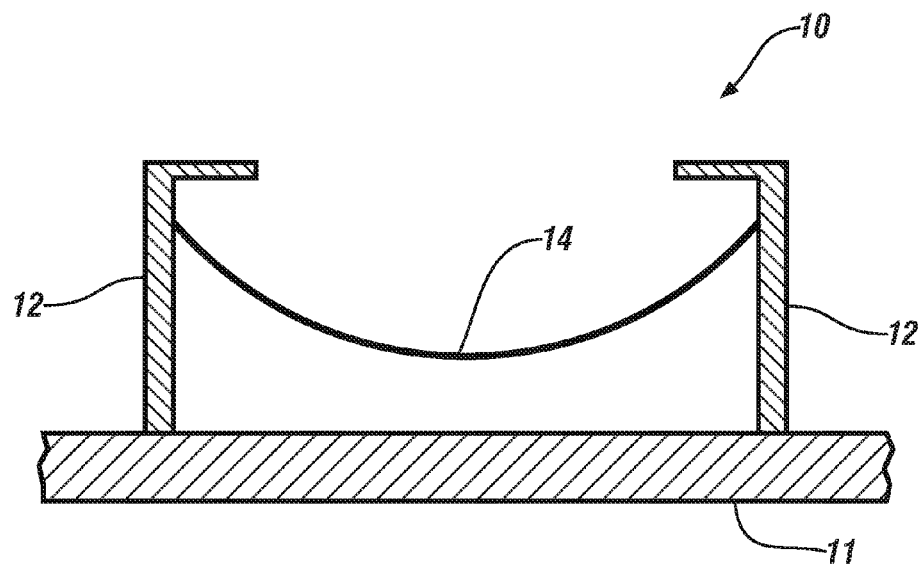
Figure 9A:
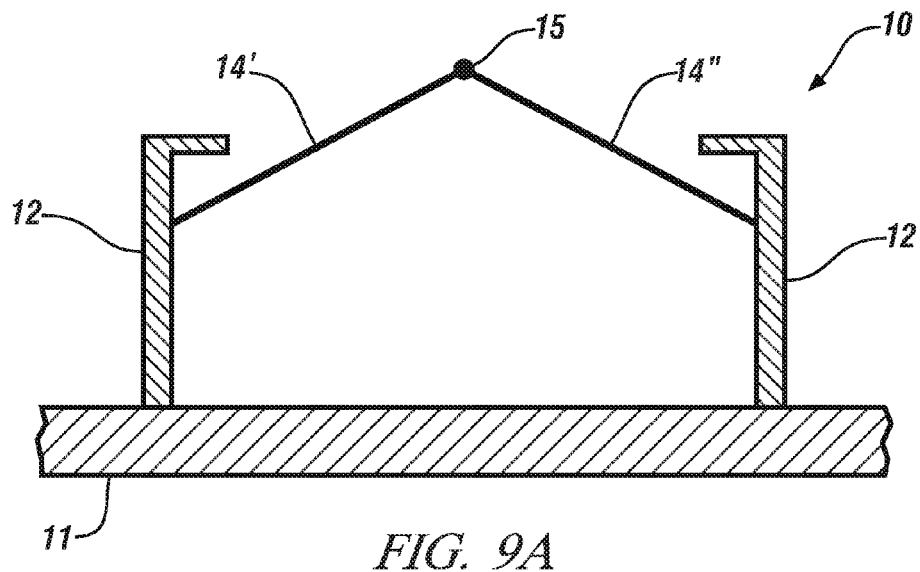
FIGS. 9A and 9B depict a schematic diagram of an exemplary bi-stable device that includes a super elastic SMA energy storage member.
Figure 9B:
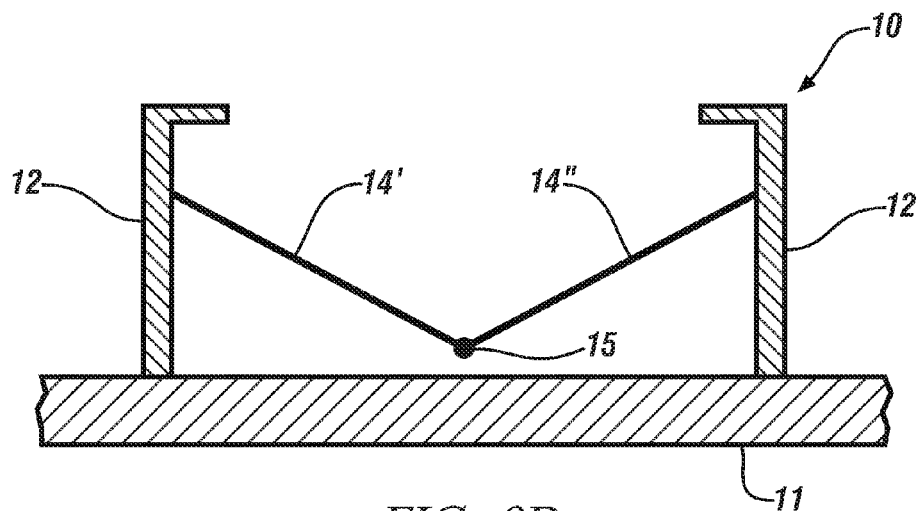

In another exemplary embodiment, a series of two or more panels connected end to end through flexible or rotatable joints (e.g., hinged joints) can be used in place of the single deformable panel in the above-described embodiments. FIGS. 9A and 9B depict a device similar to the device of FIGS. 1A and 1B, but with two panels 14' and 14" connected through hinge joint 15. The device of FIG. 9 has two stable positions, analogous to the positions depicted in FIGS. 1A and 1B. However, larger numbers of panels may be used, which will produce larger numbers of potential stable positions. Also, multiple panels or multiple end to end series of panels, having different transition energies and/or different stable positions may be disposed in parallel between a set of mounting members. Note that the term "parallel" in this context does not mean the panels have to be geometrically parallel to one another, but simply that they are each disposed between the same mounting members (i.e., in parallel) instead of being connected end to end in series. As with other embodiments, devices with multi-panel deformable members such as shown in FIG. 9 may incorporate a super elastic SMA energy storage member as a separate component or as part of the deformable member. In embodiments where the super elastic SMA storage member is part of the deformable member, a single panel could be made of super elastic SMA, all of the panels could be made of super elastic SMA, or a plurality of panels less than all of the panels could be made of super elastic SMA.

Figure 10:
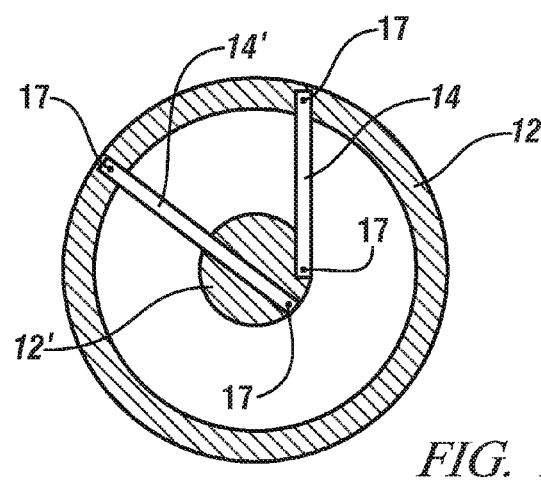
FIG. 10 depicts a schematic diagram of an exemplary bi-stable device that includes a super elastic SMA energy storage member.

Configurations that produce multiple stable positions and/or multiple transition energies between different stable positions may used in a variety of devices, including for example devices where the function of the deformable member's stable positions is to provide stop points or resting positions for moveable mounting members. An exemplary embodiment of such a device is depicted in FIG. 10, which depicts a device with inner and outer rotatable mounting members. Such devices have many potential uses, including but not limited to hinges. In FIG. 10, outer mounting member 12 is disposed in a rotational relationship to inner mounting member 12'. One of the mounting members may be fixed while the other rotates or both mounting members may be free to rotate. Deformable members 14 and 14' are disposed in parallel between and connected with hinge joints 17 to the inner and outer mounting members. Deformable members 14 and 14' each have two stable (non-deformed) positions depending on the relative rotational positions of mounting members 12 and 12' with respect to each other. If the device is configured such that the potential energy of one deformable member (in a deformed unstable position while the other member is in one its two (non-deformed) stable positions) is less than the transition energy of the other deformable member in its stable position, and if this condition is true for each stable position of each deformable member, then the device will effectively have four stable 'stop' positions as the mounting members are rotated with respect to one another. Also, different transition levels between the stable positions of each of the deformable members can provide that different levels of torque can be required to rotate the mounting member(s) between certain stable positions than required to rotate the mounting member(s) between other stable positions. As with other embodiments, the super elastic SMA energy storage member may be part of the deformable members 14 and 14' (by forming part of all of each deformable member from super elastic SMA) or may be separate from the deformable member (e.g., a super elastic SMA torsion force).

The material for the elastically deformable member may be any material having a modulus of elasticity so that it provides the desired stiffness for the particular device design parameters (e.g., length and cross-sectional area, length-width-thickness, surface area and cross-sectional area). Suitable materials may include metals such as steel and steel alloys, aluminum, polymers such as nylon, polyurethane, and other known materials. Combinations of materials may also be used, including composite materials where one or more of the materials exhibits the desired properties or they cooperate to provide the desired properties.

The devices of the exemplary embodiments described herein may be used in various applications such as push-buttons, as the walls in conduits to control/vary the flow therethrough, as variable position flow control (drag and lift) for exterior surfaces, for creating controllable/reversible interference fits such as desirable in the caps of medication containers and child safety locks, controllable sealing forces for swing panels—popped down for ease of opening and closing, popped up for enhanced perimeter sealing when panel closed.

Shape memory alloys useful for the super elastic SMA energy storage members described herein are well-known in the art. Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress, e.g., pressure from a matching pressure foot. As will be described in greater detail below, the material will retain this shape after the stress is removed.

Suitable shape memory alloy materials for fabricating the energy storage member(s) described herein include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits the desired superelasticity. Selection of a suitable shape memory alloy composition depends on the temperature range where the component will operate.

The performance characteristics of SMA's are of course dependent on temperature. In an exemplary embodiment, the energy storage member is at or above the austenite finish ($A_f$) temperature of the SMA as load is being applied to it, in order to ensure that the SMA exhibits super elastic behavior. As load is being removed, a lower temperature threshold (temperature greater than the martensite start temperature, $M_s$) will ensure super elastic behavior. Although such temperatures will ensure super elastic behavior, they are not necessarily required, as the precise austenite/martensite phase content of the SMA needed for the desired impact on the devices transition energy is dependent on the specifics of the device design parameters. Also, increasing temperature within the range in which super elastic behavior is obtained will generally increase the stress levels required for the SMA material to undergo its phase transformation from the high-modulus austenite phase to the low-modulus martensite phase. Conversely, decreasing temperature within the range in which super elastic behavior is obtained will generally decrease the stress levels required for the SMA material to undergo its phase transformation from the high-modulus austenite phase to the low-modulus martensite phase. Thus, the transition energy to move between stable positions can be controlled by controlling the temperature of the super elastic SMA energy storage member. In one exemplary embodiment, the temperature of the super elastic SMA energy storage member is maintained at a first, higher, temperature prior to desired movement of the device between stable positions so that such movement is more strongly resisted, even to the point of having the effect of 'locking' the device against movement by forces within the anticipated ranges to which the device may be exposed. Then, when movement of the device between stable positions is desired, the temperature is reduced to a second, lower, temperature to reduce the transition energy of the device, making it relatively easier to move between stable positions. The temperature may then be raised so that movement out of this new stable position is more strongly resisted.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application. The terms "front", "back", "bottom", "top", "first", "second", "third" are used herein merely for convenience of description, and are not limited to any one position or spatial orientation or priority or order of occurrence, unless otherwise noted.

The invention claimed is:

1. A bi-stable or multi-stable device having two or more stable positions, comprising
an elastically deformable member having two or more stable positions of minimal potential energy, said deformable member being movable, in response to an external force applied to the deformable member, between stable positions by moving through a position at which the deformable member has a peak potential energy;
an energy storage member, either separate from or part of the deformable member, which, during movement of the deformable member from a first of the stable positions through the position of peak potential energy to a second of the stable positions, stores energy derived from the external force applied to the deformable member as the deformable member moves from the first stable position toward the position of peak potential energy, and releases the stored energy as the deformable member moves from the position of peak potential energy toward the second stable position, wherein said energy storage member comprises a super elastic shape memory alloy configured to undergo a phase change from an austenitic phase to a martensite phase induced by stress during movement of the deformable member from the first stable position to the position of peak energy.

2. The device of claim 1, wherein the deformable member is an elastically deformable panel laterally disposed between and connected to first and second mounting members directly or indirectly connected to opposing ends of the panel, said panel maintained under compressive force along at least one vector extending between said opposing ends, said compressive force deforming the panel into one of the two stable positions.

3. The device of claim 1, comprising a plurality of elastically deformable panels laterally disposed in parallel between and connected to first and second mounting members directly or indirectly connected to opposing ends of each of the panels, said panels maintained under compressive force along at least one vector extending between said opposing ends, said compressive force deforming each of the panels into one of the two stable positions.

4. The device of claim 1, wherein the deformable member comprises a plurality of elastically deformable panels connected end to end in series by joints along two or more non-linear paths when in any of said stable positions, said plurality of elastically deformable panels disposed between and directly or indirectly connected to first and second mounting members at opposing ends of said series of panels, said mounting members providing resistive force against displacement of the series of panels from a stable position to another stable position.

5. The device of claim 2, wherein the first and second mounting members are moveable with respect to each other, and the energy storage member is disposed between and directly or indirectly connected to said mounting members or is disposed between and directly or indirectly connected to the second mounting members and a third mounting member that is in fixed spatial relationship to the first mounting member.

6. The device of claim 4, wherein the first and second mounting members are moveable with respect to each other, and the energy storage member is disposed between and directly or indirectly connected to said mounting members or is disposed between and directly or indirectly connected to the second mounting members and a third mounting member that is in fixed spatial relationship to the first mounting member.

7. The device of claim 1, wherein the energy storage member is separate from the elastically deformable member.

8. The device of claim 1, wherein the energy storage member is part of the elastically deformable member.

9. The device of claim 8, wherein the entirety of the elastically deformable member is made of super elastic shape memory alloy.

10. The device of claim 6, wherein a portion of the elastically deformable member is made of super elastic shape memory alloy and a portion of the elastically deformable member is not made of super elastic shape memory alloy.

11. The device of claim 4, wherein at least one and less than all of the elastically deformable panels are made of super elastic shape memory alloy.

12. The device of claim 1, comprising a plurality of said elastically deformable members having different levels of transition energy required to move between stable positions.

13. The device of claim 1, wherein the elastically deformable member is an elastically deformable panel or series of hinged panels disposed between and directly or indirectly connected to first and second mounting members, wherein at least one of the first and second mounting members is rotatably movable with respect to the other, and wherein the first mounting member is an outer member that fully or partially circumscribes the second, inner, mounting member, and further wherein relative rotation between the first and second mounting members provides torque to move the elastically deformable panel or series of panels between stable positions.

14. The device of claim 13, wherein the elastically deformable member is a hinged series of panels comprising at least three elastically deformable panels configured to provide at least three stable positions, each stable position corresponding to a predetermined relative rotational position of said mounting members.

15. The device of claim 13, comprising a plurality of elastically deformable members, the stable positions which correspond to a plurality of predetermined relative rotational positions of said mounting members.

16. A method of using the device of claim 1, comprising applying force to one or more components of the device to move the elastically deformable member between stable positions by moving through the position at which the deformable member has a peak potential energy, the method including changing the super elastic shape memory alloy from an austenitic phase to a martensite phase with stress applied during movement of the elastically deformable member from one of the stable positions to the position of peak potential energy.

17. The method of claim 16, further comprising controlling a temperature of the super elastic shape memory alloy.

18. The method of claim 17, wherein the temperature is reduced prior to moving the elastically deformable member to reduce the amount of force required to move the elastically deformable member.

19. The method of claim 18, wherein the temperature is increased after moving the elastically deformable member to increase the amount of force required to move the elastically deformable member, thereby inhibiting further movement of the elastically deformable member.

20. The method of claim 17, wherein the temperature is maintained above a first temperature, except during periods of desired movement of the elastically deformable member when the temperature is reduced below a second temperature, wherein the first temperature is higher than the second temperature.

21. The method of claim 20, wherein the second temperature is above a temperature $(A_f)$ at which the super elastic shape memory alloy completes a temperature-induced transformation from a martensite phase to an austenite phase.

22. The method of claim 20, wherein the second temperature is above a temperature $(M_s)$ at which the super elastic shape memory alloy begins a temperature-induced transformation from an austenite phase to a martensite phase and the first temperature is above a $(A_f)$ at which the super elastic shape memory alloy completes a temperature-induced transformation from a martensite phase to an austenite phase.

* * * * *